(12) United States Patent
Dunn

(10) Patent No.: US 7,635,407 B2
(45) Date of Patent: Dec. 22, 2009

(54) EXOTHERMIC PRESSURE LEACH AUTOCLAVE CIRCUITS

(76) Inventor: Grenvil Marquis Dunn, 37 Maskew Street, Rowhill, 1559 Springs (ZA)

( * ) Notice: Subject to any disclaimer, the term of this patent is extended or adjusted under 35 U.S.C. 154(b) by 34 days.

(21) Appl. No.: 10/585,391

(22) PCT Filed: Jan. 7, 2005

(86) PCT No.: PCT/ZA2005/000002

§ 371 (c)(1),
(2), (4) Date: Aug. 21, 2007

(87) PCT Pub. No.: WO2005/066378

PCT Pub. Date: Jul. 21, 2005

(65) Prior Publication Data

US 2008/0092693 A1    Apr. 24, 2008

(30) Foreign Application Priority Data

Jan. 7, 2004  (ZA) .................. 2004/0082
Oct. 20, 2004 (ZA) .................. 2004/8476

(51) Int. Cl.
    *C21B 15/00*   (2006.01)
    *C22B 15/00*   (2006.01)

(52) U.S. Cl. ........................ 75/743

(58) Field of Classification Search .......... 423/150.1, 423/150.4, 30, 28; 75/743, 744, 330
See application file for complete search history.

(56) References Cited

U.S. PATENT DOCUMENTS 6,451,088 B1 * 9/2002 Marsden et al. ............... 75/739
7,374,732 B2 * 5/2008 Johnson ....................... 423/27

FOREIGN PATENT DOCUMENTS

WO    WO02/092862    * 11/2002

* cited by examiner

Primary Examiner—Jerry Lorengo
Assistant Examiner—Jared Wood
(74) Attorney, Agent, or Firm—Colin P. Abrahams

(57) ABSTRACT

The efficiency of an exothermic autoclave leach process is increased by increasing the retention time of the solids fraction in the feed slurry over that of the liquid fraction. This is achieved by flashing the contents of the first oxidative autoclave compartment to a flash vessel, with the underflow therefrom passing to a thickener and the underflow from the thickener being fed to the autoclave feed tank or any tank upstream of the feed tank. Exothermic heat generated in the first compartment of the autoclave is abstracted in the flashing process. Additionally portions of the overflow from the thickener are returned to the feed tank and fed to the autoclave discharge tank.

21 Claims, 3 Drawing Sheets

EXOTHERMIC PRESSURE LEACH AUTOCLAVE CIRCUITS

TECHNICAL FIELD

This invention relates to exothermic pressure leach autoclave circuits and is concerned primarily, though not exclusively, with improving the capacity or throughput of existing circuits.

BACKGROUND ART

Pressure leach autoclave circuits are employed in the leaching of ores, concentrates, mattes, alloys, intermediates and the like for the recovery of metals into solution. Once the metals are extracted into solution the value metals can be recovered by hydrometallurgical means, such as purification followed by electrowinning, pyrohydrolysis, crystallisation, hydrogen reduction and other unit operations. In many of these integrated flow sheets (refer to FIG. 1) the pressure leach step is pivotal to the recovery of the value metals from the host material.

The leaching is often accompanied by the release of energy that has to be removed in order to avoid exceeding the design operating temperatures of the autoclave vessel. For example, in the leaching of a synthetic nickel sulphide the reaction could be represented by the following:

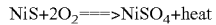

$$NiS + 2O_2 \Longrightarrow NiSO_4 + heat$$

The heat release from this reaction, as calculated from heats of formation at 25° C., is approximately 790 kilojoules per mole. In a 15 to 17 percent (w/w) concentration of nickel sulphide in water slurry the temperatures could rise to in excess of 200° C. within the autoclave where the normal operating temperature and pressure may be 160° C. and 1200 kPa(g) respectively. In most exothermic autoclave circuits a majority of the energy is liberated in the first compartment with only smaller quantities being generated in the downstream compartments. This heat release is often employed to raise the feed slurry to the design operating temperature. However in many of these circuits the design operating temperature can be exceeded in the first compartment.

The excess heat could be removed by a variety of means, such as quenching by introducing a cooling fluid into the autoclave, internal cooling coils, external coolers, and what is known in the art as "flash and recycle". Quenching and internal coils have many known practical and process limitations. External coolers avoid many of the problems of internal coils but still may result in scaling of the heat transfer surfaces and significant wear to pumps and isolating valves. In addition, all the above mentioned means are unable adequately to address intermittent surges in mass feed above design and, consequently, temperature excursions above the design value can occur to the detriment of the autoclave's lining systems or the autoclave discharge product.

The flash and recycle system was first introduced by the current inventor in the mid 1980's and employs a first autoclave compartment flash via a flash tank with flash underflow return to the autoclave feed tank. The feed tank serves a dual role; it is both an autoclave feed tank and an external extension of the autoclave's first compartment. In a well designed system, the temperature in the first compartment can be maintained at set point +2° C./−1° C. This temperature control is acceptable for both brick lined and alloy autoclaves. Some of the advantages of this system include optimal utilisation of the installed reactor volume; if required, concentration of the reactor contents through the evaporation of water flashed as steam; and the potenial to use the flashed steam as an energy source elsewhere in the operation. Considered holistically, the flash and recycle process provides the autoclave designer with the maximum degrees of freedom and several process benefits. PCT/AUO2/00584 discloses a flash and recycle system particularly suited to autoclaves operating at low temperature e.g. 120° C. that uses vacuum for the flash.

This invention seeks to enhance the benefits of the flash and recycle system.

DISCLOSURE OF THE INVENTION

One aspect of the invention provides a method of leach autoclave processing including the steps, in a desired order, of:
flashing the autoclave and generating a flash underflow;
performing a solid-liquid separation on the flash underflow to produce a solids fraction and an aqueous fraction; and
returning at least a portion of the solids fraction to the autoclave.
returning a portion of the aqueous fraction to the autoclave.
This method may be referred to as a flash-thicken-recycle process or FTR and is referred to as such hereinafter.

The aqueous fraction may be returned to the autoclave, either in the solids fraction or, preferably, in a discrete aqueous fraction stream.

The autoclave may have several compartments, the autoclave flash being obtained from any desired compartment.

Preferably, all of the solids fraction is returned to the autoclave. The solids fraction may be returned to any desired compartment of the autoclave. The return to the autoclave may be direct or indirect through any process upstream of the autoclave.

Where the flash is from the first compartment of the autoclave, then preferably the reaction extent in the first compartment is in excess of 50%, more preferably in the range of 85 to 95%.

The solids fraction from the separation may be returned to an autoclave feed tank to be further leached. This is done to increase the autoclave retention times with respect to the solids fraction.

The solids fraction may be returned to an autoclave feed surge tank upstream of the autoclave feed tank or to an autoclave feed density adjust tank between the surge and autoclave feed tank.

Oxygen is fed into the autoclave and mixed with the product therein using agitators to leach the value metals. Insufficient oxygen limits the leach reaction, and can affect throughput. Thus, preferably, the autoclave agitators are selected and operated such that they do not limit oxygen mass transfer within the autoclave. Instead oxygen mass transfer is preferably controlled by regulating the slurry viscosity within the autoclave using the returned solids fraction.

Preferably, the method includes adjusting the level of the feed tank to compensate for poor density adjustment in the vessels upstream of the feed tank. This step ensures that any out of specification leach product does not pass out of the autoclave.

The solid-liquid separation is often best achieved with a thickener, but it can just as easily be achieved with other means such as a classifier or a filter. The term "thickener" as used hereafter refers to all forms of solid-liquid separation, except where the context indicates otherwise.

A development of the method includes flashing selected subsequent compartments after the first compartment, the flash slurry obtained thereby being separated into an aqueous fraction and a solids fraction.

Preferably, the flash underflow from the selected subsequent compartments is fed to a aqueous/solids separator, the aqueous fraction being fed forwards in the process.

The solids fraction or solids residues may be returned to the autoclave for further processing at the same or different conditions to those prevailing in the initial part of the autoclave. This enables the use of a reactor in which two or more similar processes are conducted within the same pressure envelope with only the compartment dividing walls keeping the processes separate.

The aqueous fraction may be returned to the autoclave for the removal of impurities, the returned material being fed either to the first compartment or to any desired downstream compartment.

At least a portion, and preferably the whole, of the aqueous fraction may be passed to an autoclave discharge tank.

In one form of the invention the flash from the autoclave is directed to a flash tank from where it is fed to a thickener, with the solids fraction being fed to the autoclave for reprocessing.

In another form of the invention the flash from the autoclave is directed into the feed tank, with the slurry in the feed tank being fed to a thickener and the solids fraction therefrom being fed back to the autoclave for reprocessing.

In either form of the invention, the feed to the autoclave may be direct or indirect through the feed tank or any suitable tank, such as a surge or density adjust tank upstream of the feed tank.

Another aspect of the invention provides a leach autoclave processing plant comprising: an autoclave feed tank, an autoclave; means to flash slurry from the autoclave into a suitable tank in which a feed underflow can be generated; separation means to perform a solid-liquid separation on the feed underflow to produce a solids fraction and an aqueous fraction; and means to return at least the solids fraction to the autoclave.

Preferably, the plant is arranged such that the solids fraction obtained from the separation means is fed to the autoclave via the autoclave feed tank.

The suitable tank into which the autoclave flash is directed may be a flash tank or may be the feed tank.

Further features of the plant of the invention are provided to perform the aspects, developments and steps of the method of the invention described above. Such features may be abstracted from the description of the method and/or from the description and examples below.

Further features, variants and/or advantages of the invention will emerge from the following non-limiting description of examples of the invention made with reference to the accompanying schematic drawings.

DESCRIPTION OF ILLUSTRATED EMBODIMENTS

Figure 1:
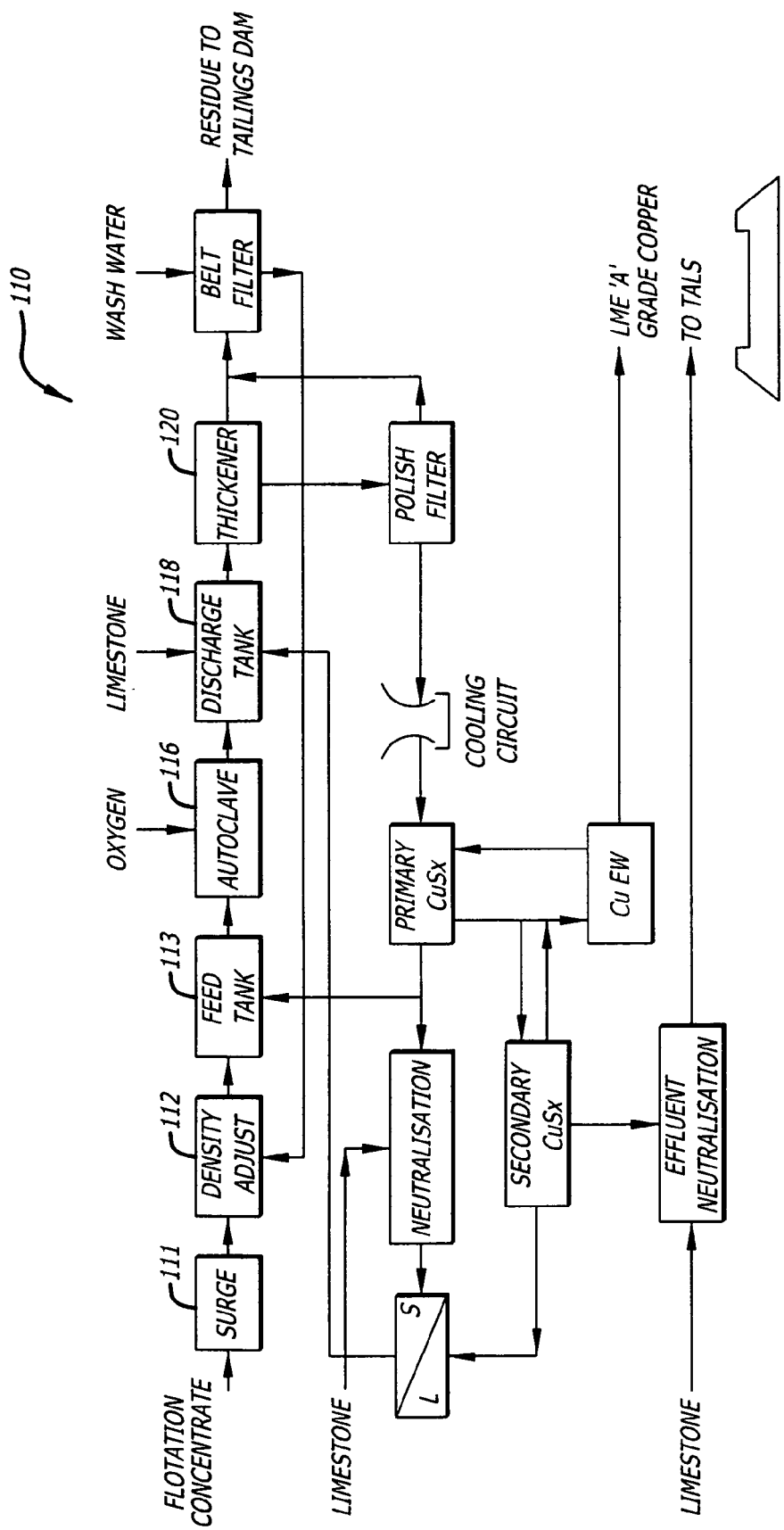
FIG. 1 shows a typical leach circuit for the leaching of copper concentrate

In the drawings the same or similar parts have the same reference numbers.

FIG. 1 shows a typical autoclave pressure leach circuit 110 for recovering copper from copper concentrate. The concentrate is fed to an autoclave 116, via a surge tank 111 a density adjust tank 112 and a feed tank 113, and reacted with oxygen at elevated temperature and pressure. The leached product is neutralized with lime in a discharge tank 118, then separated using a thickener 120. The slurry from the thickener is filtered cooled and value metals recovered. Unleached or partially leached fractions are reprocessed in the autoclave or treated and recovered one or more suitable processes. Feedback circuits are used on the unleached and partially leached products, reagents and water to optimize the value metal output and the use of heat, reagents, water, etc.

Figure 2:
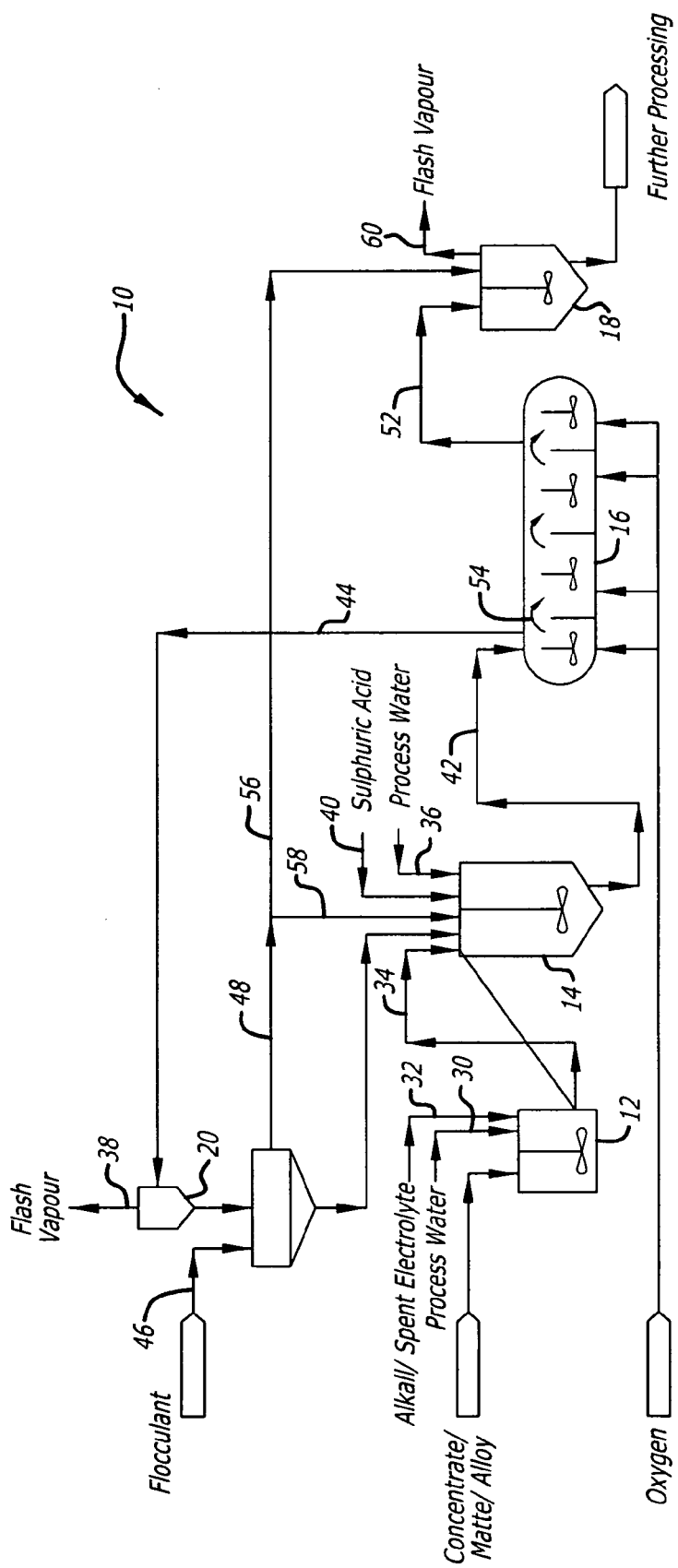
FIG. 2 shows a flow diagram of an example of the FTR process of the invention.

FIG. 2 shows a part of a copper concentrate leach plant 10 with a flash-thickener-recycle or FTR process of the invention. The plant includes a density adjust tank 12, an autoclave feed tank 14, a four compartment autoclave 16, an autoclave discharge tank 18, a flash tank 20, and a solid-liquid separation tank 22 in the form of a thickener. Feed lines or streams, as they are referred to in the art, 30 to 60 convey material to, between and from the tanks 12 to 22.

The arrangement of the plant 10 is described by following the flow of material through the plant as follows:

Input of a sulphide concentrate, matte or alloy is fed to density adjust tank 12, the density of the material in the tank being adjusted with water via feed line or stream 30 and a reagent (acidic such as a spent electrolyte or alkali such as ammonia, sodium hydroxide, etc.), via feed line 32. The mass feed to the autoclave feed tank 14 is determined by appropriate instrumentation in feed line 34.

Feed tank 14 can receive process water via line 36 if the impact of the release of flash vapour via line 38 needs to be compensated for. Alternatively, the use of process water is invoked on a "need-to-have" basis. The feed tank may also receive a reagent, such as sulphuric acid or an alkali depending on the process intent, via line 40.

In operation, blended slurry received by feed tank 14 is pumped via line 42 into the autoclave first compartment. As the reaction proceeds and energy is released the temperature attains the set or desired temperature for this compartment. At temperatures above the set point the slurry is discharged from the first compartment as stream 44 to the flash tank 20 where a flash vapour component is released via line 38 either to atmosphere or to a heating duty elsewhere.

The flash tank underflow is drained to thickener 22 where a phase separation is achieved with the aid of a flocculant fed via stream 46. The overflow from the thickener is directed externally via line 48 in full or in part to the autoclave discharge tank 18, while the thickened solids are returned to the autoclave feed tank 14 via line 50.

In the design or modification of an existing autoclave, the first compartment is sized to achieve in excess of 40% typically 85-95% of the overall reaction extent. This implies that the thickener 22 overflow in stream 48 is often very similar in composition to the autoclave discharge stream 52 after flash.

The mean flow rate in the first and, in this case, ensuing compartments changes as follows:

Flash-recycle: {feed tank 34+ process water 36+ reagent 40} less flash vapour 38 FTR: . . . feed tank 34+ process water 36+ reagent 40 plus flocculant 46}, less {flash vapour 38+ thickener overflow 56}

Thus the solids fraction retention time can be increased very significantly. Other factors such as oxygen gas mass transfer at the autoclave impellers may become rate limiting or the feed pumps on the feed tank 14 servicing the autoclave may reach their limit and thereby constrain further productivity gains.

Existing autoclaves originally fitted with a quench cooling system can in certain cases be increased in capacity by in excess of 100% whilst at the same time, in some cases, de-rated in pressure and temperature by employing the FTR process of the invention. The net feed rate 54 through the autoclave can be adjusted to suit the required mass flow and extraction simply by adjusting the volumetric flow of thickened solids stream 50 and overflow stream 56.

An example will now be given relating to the processing of nickel-copper sulphide mattes.

An autoclave system originally fitted with a quench cooling circuit was converted to incorporate the FTR process.

The flow sheet employed was similar to that in FIG. 2. The feed at stream 34 consisted of a matte semi-product from a previous step in the process, not shown. The operating temperature of the first compartment was 140° C. and the first pass extraction of new feed to the first compartment was typically 85%. Some of this "partially leached" feed from the first compartment was partly fed forward to the second compartment as stream 54, but a majority was directed with the first compartment temperature control stream 44 to the flash tank 20 where the underflow was fed to the thickener 22.

The thickener overflow 48 gravitated in part along line 56 to the autoclave discharge tank while the balance was returned via line 58 to the feed tank. The solids plus some liquor making up stream 50 was also fed to feed tank 14.

In the autoclave, the slurry comprising stream 54 was further leached in the second and ensuing compartments and finally discharged as stream 52 into discharge tank 18 and flashed. The flash vapours from the discharge tank 18 were vented to atmosphere via line 60. The flash underflow from stream 52 and the thickener overflow 56 were blended in the discharge tank.

The chemistry in the autoclave can, in its simplified form, be represented by the following equations:

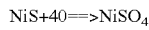
$$NiS + 4O \Longrightarrow NiSO_4$$

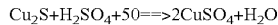
$$Cu_2S + H_2SO_4 + 5O \Longrightarrow 2CuSO_4 + H_2O$$

Both these reactions generated significant energy and between 5 and 5.5 tonnes of steam per hour was released in the flash outlet 38.

The composition of various streams is given in tables 1A, 2A and 3A below.

The net flow through the autoclave is calculated by difference as stream 54 without compensating for density within the autoclave.

The net flow 54 is approximately 25% of the feed flow 34. However prior to this incorporation of this invention the feed flow was approximately 13.5 m³/h. The slurry feed with this invention had increased by over 90% to 25.8 m³/h.

Figure 3:
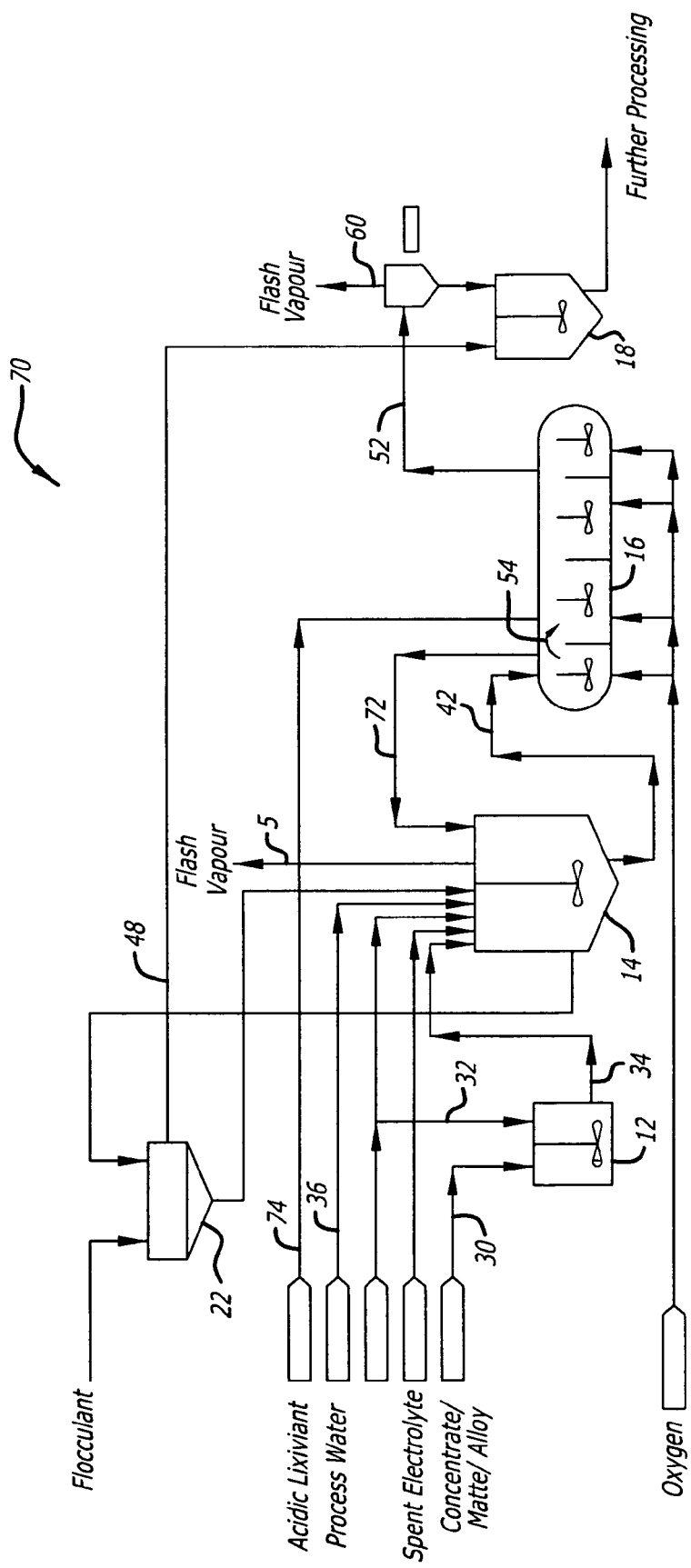
FIG. 3 shows a flow diagram of another example of the FTR process of the invention.

FIG. 3 shows a part of another copper concentrate leach plant 70 with a flash-thickener-recycle or FTR process of the invention. The plant includes a density adjust tank 12, an autoclave feed tank 14, a four compartment autoclave 16, an autoclave discharge tank 18, and a solid-liquid separation tank 22 in the form of a thickener. Feed lines or streams, as they are referred to in the art, 30 to 60 convey material to, between and from the tanks 12 to 22 much as described for the plant of FIG. 2, except that:

a. the flash from the autoclave first compartment is fed via a line 72 back into the feed tank 14;
b. the underflow in the feed tank is fed to the thickener 22. where, again, flocculant is added;
c. the solids fraction from the thickener is fed directly back to the feed tank, with the liquids fraction still being feed to the discharge tank 18; and
d. an acidic lixiviant is fed directly to the second compartment of the autoclave via line 74 to compensate for the changed chemistry in the feed tank.
e. the flash vapor is discharged from the feed tank 14 via a line 5.

The invention is not limited to the precise details described above and shown in the drawings. Modifications may be made and other embodiments developed without departing from the spirit of the invention.

TABLE 1A

| Stream | | Solids Composition (%) | | | |
|---|---|---|---|---|---|
| | N° | Ni | Cu | Fe | S |
| Circuit Feed Solids | (30) | 28.8 | 54.4 | 2.4 | 22.4 |
| Auto Feed Solids | (42) | 16.9 | 63.4 | 2.7 | 25.8 |
| Thickener Underflow | (50) | 10.4 | 50.9 | 0.8 | 23.4 |
| Fourth Compartment | (52) | 6.05 | 43.0 | 1.1 | 21.8 |

TABLE 2A

| Stream | | Liquor Composition (g/L) | | | |
|---|---|---|---|---|---|
| | N° | Ni | Cu | Fe | H₂SO₄ |
| Spent Electrolyte | (32) | 48 | 25 | 1.5 | 77 |
| Slurry Feed | (34) | 40 | 24 | 1.2 | 49 |
| Autoclave Feed | (42) | 57 | 64 | 1.6 | 49 |
| Flash Feed | (44) | 63 | 85 | 1.7 | 18 |
| Thickener Overflow | (48) | 63 | 85 | 1.7 | 18 |
| Fourth Compartment | (52) | 58 | 112 | 1.3 | 15 |

TABLE 3A

| | Stream N° | Flow (m³/h) | | Stream N° | Flow (m³/h) |
|---|---|---|---|---|---|
| Slurry Feed | (34) | 25.8 | Flash Equivalent Flow | (38) | 5.4 |
| Process Water | (36) | 5.0 | Thickener Overflow | (56) | 20.2 |
| Sulphuric Acid | (40) | 0.48 | Autoclave Flow | (54) | 6.2 |
| Total aqueous flow | | 30.8 | Total aqueous flow | | 31.4 |

Note:
Flows not compensated for temperature/density within the autoclave

The invention claimed is:

1. A method of leach autoclave processing in an autoclave having a first compartment and at least one subsequent compartment, including the steps, in a desired order, of:
    flashing at least a portion of the contents of the first compartment of the autoclave and generating a flash underflow;
    performing a solid-liquid separation on the flash underflow to produce a solids fraction and an aqueous fraction;
    returning the solids fraction to the first compartment of the autoclave; and
    returning a portion of the aqueous fraction to the autoclave.

2. The method of claim 1, including returning some of the aqueous fraction to the autoclave in a discrete overflow stream.

3. The method of claim 1, including returning some of the solids fraction directly to the autoclave.

4. The method of claim 1, including returning some of the solids fraction to the autoclave indirectly through a desired process upstream of the autoclave, the desired process being selected from an autoclave feed tank, an autoclave feed surge tank, and an autoclave feed density adjust tank upstream of the autoclave feed tank.

5. The method of claims 1, including controlling oxygen mass transfer in the autoclave by regulating viscosity using the returned solids fraction.

6. The method of claim 1, wherein the reaction extent in the first compartment is controlled to be in excess of 40%.

7. The method of claim 6, including controlling the reaction extent in the first compartment to be in the range of 85 to 95%.

8. The method of claim 1, including adjusting the level of the feed tank to ensure that any out of specification leach product does not pass out of the autoclave.

9. The method of claim 1, wherein the solid-liquid separation is achieved using at least one of a thickener, a classifier and a filter.

10. The method of claim 1, wherein the autoclave has multiple compartments and the method includes flashing selected subsequent compartments of the autoclave after the first compartment, the flash slurry obtained thereby being fed to a solid-liquid separation step to produce a solids fraction and an aqueous fraction.

11. The method of claim 10, including feeding the flashed material from the selected subsequent compartment to a solid-liquid separation step to produce a solids fraction and an aqueous fraction, at least a portion of the aqueous fraction being fed forwards in the process and the solids fraction being fed to the autoclave for further processing at desired conditions relative to the conditions prevailing in the initial part of the autoclave.

12. The method of claim 11, including using the autoclave to conduct at least two similar leaching processes within the same pressure envelope with only the compartment dividing walls keeping the processes separate.

13. The method of claim 11, including returning the aqueous fraction to the autoclave for the removal of impurities, the aqueous fraction being fed to a desired compartment of the autoclave.

14. The method of claim 11, including flashing the slurry of an intermediate compartment to remove energy and returning the flashed slurry to the same or subsequent compartment of the autoclave.

15. The method of claim 1, including directing the flash from the autoclave to a flash tank; directing the flash underflow from the flash tank into a thickener to produce a solids fraction and an aqueous fraction; and feeding the solids fraction to the autoclave for reprocessing.

16. The method of claim 1, including directing the flash from the autoclave into a feed tank, feeding the feed tank underflow to a thickener to produce a solids fraction and an aqueous fraction; and feeding the solids fraction to the autoclave for reprocessing.

17. The method of claim 16, including feeding the solids fraction to one of the feed tank and a suitable tank upstream of the feed tank from where the solids fraction can be fed with other materials to the autoclave.

18. A leach autoclave processing plant comprising: an autoclave feed tank; an autoclave having a first compartment and at least one subsequent compartment; means to flash at least a portion of the contents of the first compartment of the autoclave into a suitable tank in which a feed underflow can be generated; separation means to perform a solid-liquid separation on the feed underflow from the first compartment of the autoclave to produce a solids fraction and an aqueous fraction; and means to return at least the solids fraction to the first compartment of the autoclave.

19. The plant of claim 18, wherein the solids fraction obtained from the separation means is fed to the autoclave via the autoclave feed tank.

20. The plant of claim 18, wherein the suitable tank into which the autoclave flash is directed is a flash tank.

21. The plant of claim 18, wherein the suitable tank into which the autoclave flash is directed is the feed tank.

* * * * *